US010255564B2

(12) United States Patent
Schimmelpfennig

(10) Patent No.: US 10,255,564 B2
(45) Date of Patent: Apr. 9, 2019

(54) CONTEXT SPECIFIC RESOURCE EDITORS

(71) Applicant: Software AG, Darmstadt (DE)

(72) Inventor: Jens Schimmelpfennig, Gudingen (DE)

(73) Assignee: SOFTWARE AG, Darmstadt (DE)

( * ) Notice: Subject to any disclaimer, the term of this patent is extended or adjusted under 35 U.S.C. 154(b) by 819 days.

(21) Appl. No.: 14/170,142

(22) Filed: Jan. 31, 2014

(65) Prior Publication Data
US 2015/0220859 A1    Aug. 6, 2015

(51) Int. Cl.
*G06Q 10/06* (2012.01)
(52) U.S. Cl.
CPC ....... *G06Q 10/0631* (2013.01); *G06Q 10/067* (2013.01)
(58) Field of Classification Search
CPC .................. G06Q 10/0631; G06Q 10/067
USPC ......................................... 705/7.12
See application file for complete search history.

(56) References Cited

U.S. PATENT DOCUMENTS

| 8,121,874 B1* | 2/2012 | Guheen | G06Q 10/063 |
| | | | 705/28 |
| 2003/0028419 A1* | 2/2003 | Monaghan | G06Q 10/06 |
| | | | 705/7.12 |
| 2005/0154742 A1* | 7/2005 | Roth | G06F 8/00 |
| 2007/0162318 A1* | 7/2007 | Bean | G06Q 10/103 |
| | | | 705/301 |
| 2009/0187883 A1* | 7/2009 | Kuester | G06F 9/4436 |
| | | | 717/105 |
| 2009/0281845 A1* | 11/2009 | Fukuda | G06Q 10/06393 |
| | | | 705/7.39 |
| 2009/0281865 A1* | 11/2009 | Stoitsev | G06Q 10/06 |
| | | | 705/7.22 |
| 2010/0235839 A1* | 9/2010 | Hu | G06F 9/5038 |
| | | | 718/100 |

(Continued)

OTHER PUBLICATIONS

C. C. Ekanayake, M. La Rosa, A. H. M. Ter Hofstede, and M-C Fauvet. 2011. Fragment-based version management for repositories of business process models. In Proceedings, 2011th Confederated international conference on On the move to meaningful internet systems—vol. Part I (OTM), Robert Meersman, Tharam Dillon.*

(Continued)

*Primary Examiner* — Timothy Padot
*Assistant Examiner* — George H Walker, III
(74) *Attorney, Agent, or Firm* — Nixon & Vanderhye P.C.

(57) ABSTRACT

A computerized method implemented in at least one processor for at least one of viewing, editing, and handling Business Process Management artifacts, the method including storing in a database repository coupled to the at least one processor, a plurality of computerized editor representations, receiving, by the at least one processor, a computerized request from a client computer for a database artifact stored in the database repository, accessing, by the at least one processor, the requested database artifact within the database repository, selecting, by the at least one processor, a specific computerized editor representation from the plurality of computerized editor representations, the specific computerized editor representation corresponding to the requested database artifact, and causing, by the at least one processor, the specific computerized editor to be provided to the client computer along with the requested database artifact.

20 Claims, 18 Drawing Sheets

(56) References Cited

U.S. PATENT DOCUMENTS

| | | | | |
|---|---|---|---|---|
| 2011/0083167 | A1* | 4/2011 | Carpenter | G06F 17/30563 726/4 |
| 2011/0246253 | A1* | 10/2011 | Yu | G06Q 10/00 705/7.13 |
| 2011/0320381 | A1* | 12/2011 | Srivastava | G06Q 10/067 705/348 |
| 2012/0030573 | A1* | 2/2012 | Balko | G06F 9/4426 715/735 |
| 2012/0110157 | A1* | 5/2012 | Portier | G06F 17/30893 709/223 |
| 2012/0246122 | A1* | 9/2012 | Short | G06Q 10/06 707/690 |
| 2013/0111336 | A1* | 5/2013 | Dorman | G06F 9/4843 715/255 |
| 2013/0166547 | A1* | 6/2013 | Pasumarthi | G06Q 10/06 707/728 |

OTHER PUBLICATIONS

OMG—Business Process Model and Notation (BPMN), Version 2.0, Jan. 2011, 538 pages. http://www.omg.org/spec/BPMN/2.0/PDF/.

OMG—Unified Modeling Language (OMG UML), Infrastructure, Version 2.4.1, Aug. 2011, 230 pages. http://www.omg.org/spec/UML/2.4.1/Infrastructure/PDF/.

Amazon Simple Storage Service, API Reference, Mar. 2006, 381 pages. http://docs.aws.amazon.com/AmazonS3/latest/API/s3-api.pdf.

Foundation for Intelligent Physical Agents, FIPA Device Ontology Specification, Feb. 2002, 25 pages. http://www.fipa.org/specs/fipa00091/SI00091E.pdf.

Wikipedia—Representational State Transfer, retrieved online Oct. 5, 2015, 7 pages. http://en.wikipedia.org/wiki/Representational_State_Transfer.

RESTful Web Services, Leonard Richardson et al., May 2007, 448 pages. http://www.crummy.com/writing/RESTful-Web-Services/RESTful_Web_Services.pdf.

IBM—Developing Client Applications that use IBM BPM REST APIs, retrieved online Oct. 5, 2015, 1 page. http://www-01.ibm.com/support/knowledgecenter/SSFTN5_8.5.0/com.ibm.wbpm.bpc.doc/topics/cdev_restapis.html.

IBM—REST Interface BPD-Related Resources, retrieved Oct. 5, 2015, 17 pages. http://www-01.ibm.com/support/knowledgecenter/SSFTN5_8.5.0/com.ibm.wbpm.ref.doc/rest/bpmrest/rest_bpm_wle.htm.

Signavio Process Editor, retrieved online Oct. 5, 2015, 2 pages. http://www.signavio.com/products/process-editor/.

Software AG Government Solutions—ARIS Business Architect & Designer, Copyright 2013, retrieved online Oct. 5, 2015, 4 pages. http://www.softwareaggov.com/uploads/files/SAG_GS_ARIS_BusArchDesign_FS_Jan13_Web.pdf.

* cited by examiner

| Model types | | | | |
|---|---|---|---|---|
| Name ▲ | | | | Type |
| Authorization map | | | | ARIS default |
| Bow tie diagram | | | | ARIS default |
| BPMN allocation diagram (BPMN 1.x) | | | | ARIS default |
| BPMN allocation diagram (BPMN 2.0) | | | | ARIS default |
| BPMN allocation diagram (BPMN 2.0) - Derived model type | | | | Derived |
| BPMN collaboration diagram (BPMN 2.0) | | | | ARIS default |
| BPMN conversation diagram (BPMN 2.0) | | | | ARIS default |
| BPMN process diagram (BPMN 1.x) | | | | ARIS default |
| BPMN process diagram (BPMN 2.0) | | | | ARIS default |
| BSC Cause-and-effect diagram | | | | ARIS default |
| Business controls diagram | | | | ARIS default |
| Business Model Canvas | | | | ARIS default |
| Business rule allocation diagram | | | | ARIS default |
| Business rule architecture diagram | | | | ARIS default |
| Business segment matrix | | | | ARIS default |

*FIG. 10*

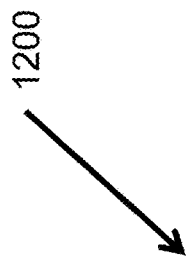

| Frame Ontology | screen-description fipa-device | | | |
|---|---|---|---|---|
| Parameter | Description | Presence | Type | Reserved Values |
| width | The width of the screen. This value must be positive. | Optional | integer | |
| height | The height of the screen. This value must be positive. | Optional | integer | |
| unit | The unit for the width and height parameters of this frame. | Optional | string | mm cm inch |
| resolution | The resolution description for the screen. | Optional | Set of resolution-description | |
| color | Has the value true if the device has a color screen; false if it has a monochrome screen. | Optional | boolean | true false |

CONTEXT SPECIFIC RESOURCE EDITORS

BACKGROUND

Successful businesses typically perform specific, structured activities that lead to consistent and stable revenue. Each of the series of activities that a business performs from start to finish is typically known as a business process. A business process is a collection of related and structured activities performed to achieve a specific goal. In some instances, this goal is the creation of a product or service that can be sold to a consumer. For example, a business process can describe the fabrication steps involved in the manufacturing of a product. In large businesses, however, the tracking of individual business processes can be difficult. A basic system for BPM that provides simple and easy to use modeling tools can be both powerful and important for businesses.

SUMMARY

In general, in an aspect, embodiments of the disclosed subject matter can provide a computerized method implemented in at least one processor for at least one of viewing, editing, and handling Business Process Management artifacts, the method including storing in a database repository coupled to the at least one processor, a plurality of computerized editor representations, receiving, by the at least one processor, a computerized request from a client computer for a database artifact stored in the database repository, accessing, by the at least one processor, the requested database artifact within the database repository, selecting, by the at least one processor, a specific computerized editor representation from the plurality of computerized editor representations, the specific computerized editor representation corresponding to the requested database artifact, and causing, by the at least one processor, the specific computerized editor to be provided to the client computer along with the requested database artifact.

Various aspects of the disclosed subject matter can provide one or more of the following capabilities: BPM resources can provide their own editor representations. Editor representations can be provided on-demand to BPM design tools. BPM designer implementations can be more lightweight than prior BPM designs. A BPM designer tool can include only the editing functionalities it needs to satisfy a particular user's needs. Software maintenance can be reduced compared with prior techniques (e.g., if a new model type is introduced, the editor component can be rolled-out to the BPM repository server rather than each individual BPM design tool). A BPM repository server can return data representations for BPM resources and appropriate context-specific editor representations, which can be used to design and manipulate a resource itself. A BPM server can provide a dynamically created editor for a BPM system that can be adapted for each individual user and business process. These and other capabilities of the disclosed subject matter will be more fully understood after a review of the following figures, detailed description, and claims.

BRIEF DESCRIPTION OF THE FIGURES

FIG. 10 is an exemplary extract of a default method provided by a BPM server.

FIG. 12 is an extract of the Foundation for Intelligent Physical Agents (FIPA) device ontology that can be used for device description.

DETAILED DESCRIPTION

Figure 1A:
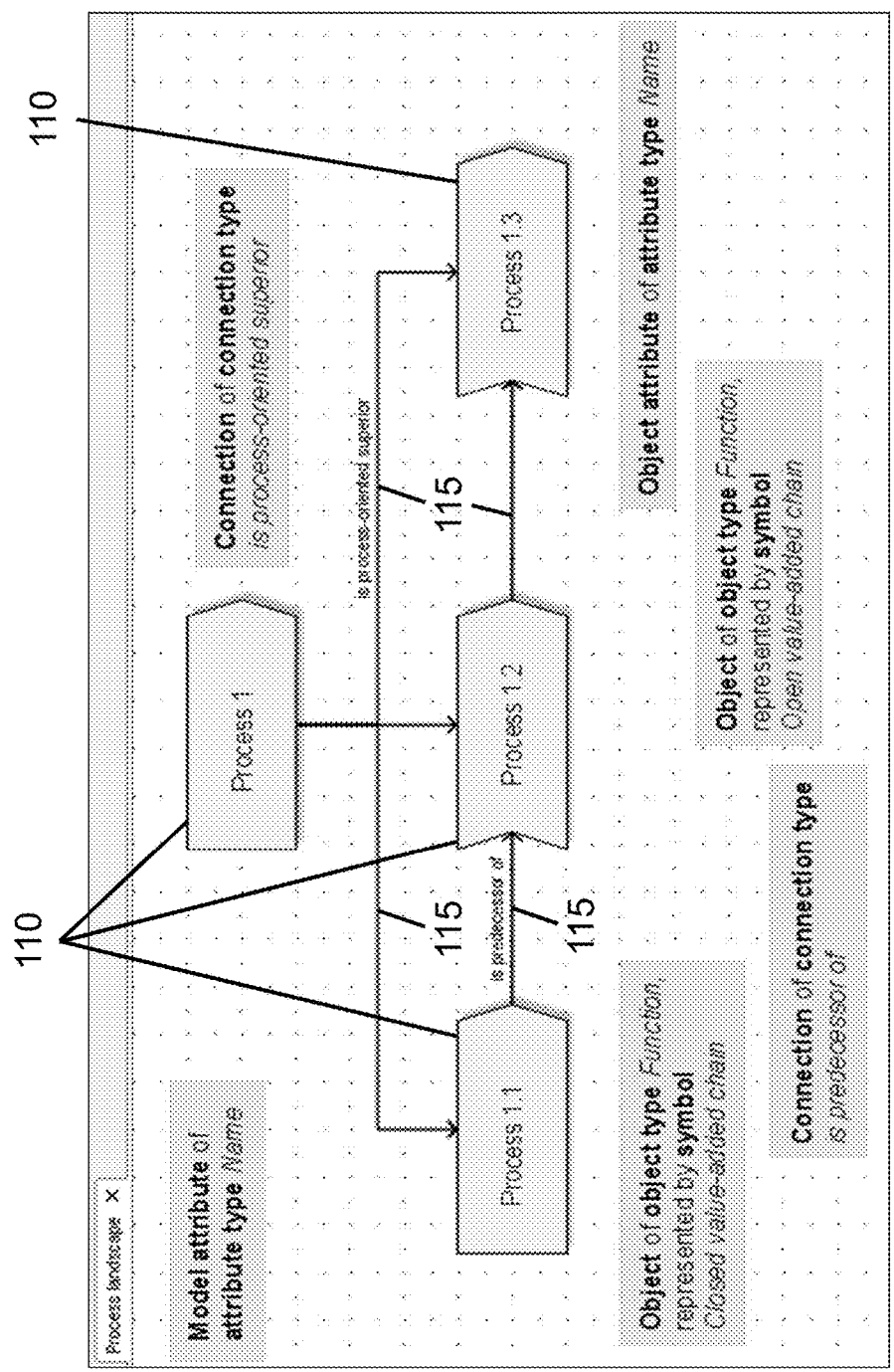
FIG. 1A is an exemplary model instance.

Embodiments of the subject matter disclosed herein relate to techniques in which business process management (BPM) resources can provide their own set of representations. For example, a user can generate a request for a BPM resource on a server. In response, the server can determine a corresponding representation that the user can use to view and/or interact with the BPM resource. The corresponding representation can be determined in real-time and/or on demand such that the user is provided with the representation along with the requested resource. For example, if a user requests an organizational diagram model from a server, the server can provide an image representation of that organizational model that can be integrated into a company's internet portal, a PDF document representation as a company handbook, a spreadsheet representation as a phone list, etc. In some embodiments, the BPM resources are requested and provided over a Representational State Transfer (REST) interface. In addition to "read-only" representations, embodiments can be configured such that BPM resources provide editor representations that can be displayed and executed in a general design tool (e.g., BYOE—bring your own editor). Other embodiments are within the scope of the disclosed subject matter.

BPM provides methods, tools, and technologies that can be used to design, analyze, optimize, and control operational business processes. For example, a parcel delivery service could use BPM to model the complete process of delivery from acceptance of the package to delivery at its destination. In other exemplary contexts, BPM can expand beyond the conceptual design of a process into actually controlling application systems. For example, a financial institute could use BPM tools to model the process of credit approval, defining the process flow depending on diverse criteria. For instance, if the credit level exceeds a certain limit, a second approver would have to be involved in any approval. In some senses, BPM can be thought of as a way of bridging the traditional gap between business people and information technologists by providing a computerized system that streamlines and enhances traditional business methods.

In modern BPM tools, modeling methods can be used to create abstract models of real-world "artifacts." One example of a model is an organizational chart representing an organization. In one sense, models can generally be thought of as a generic term for an abstract description of any relevant real-world artifact (such as business processes, data structures, software systems, etc.) that is expressed in a semi-formal or formal way following the conventions of an abstract language. The latter, defining all possible modeling elements such as objects and their attributes, potential relationships between modeling primitives, and general modeling conventions, is called a "meta-model".

Meta-models can generally be thought of as, for example, a formalism or abstract language consisting of a set of modeling concepts (e.g., the language's abstract syntax) with defined semantics, which can be used to describe models. Part of a meta-model's specification can be the definition of what constitutes a valid "sentence" in this abstract language (e.g., how the modeling concepts can be combined to describe more complex structures). In some instances, a meta-model can define all possible modeling elements such as objects and their attributes, potential relationships between modeling primitives, and general modeling conventions.

In practice, many general meta-models as well as application/domain-specific meta-models exist. Each meta-model can represent a collection of modeling elements that can be used to describe actual models and can be defined in an abstract language. As an example, a UML class diagram can provide modeling elements such as classes, associations, properties, etc. Models that comply with a meta-model (e.g., valid models) can be generally referred to as "instances" of its meta-model. When creating a model using the modeling elements provided by a meta-model, the meta-model's modeling elements can be "instantiated" in the actual model. Within graphical representations of models, at least some of the modeling elements can be visually represented by either "symbols" or "connections." (e.g., as shown in FIG. 1A). Meta-models can preferably be created as general meta-models and/or as application domain-specific meta-models. In some embodiments, meta-models can include Unified Modeling Language (UML) modeling methods (e.g. UML class diagrams, UML component diagrams), ARIS meta-model modeling methods (e.g., Event-Driven Process Chain (EPC), Value Added Chain Diagram, Organizational Chart), and Business Process Model and Notation (BPMN) meta-model modeling methods.

The term artifact can generally encompass an element of a model that combines a process flow with actual data for a more complete picture of a particular system. Artifacts can include model types and object types. For example, an artifact could refer to the step "determine current inventory" within a shipping process, and executing this step in the model could result in a database query that returns the inventory in the system.

Since BPM strives to cover both commercial and technical aspects of business processes, a wide variety of modeling methods have evolved. Some, such as BPMN and UML, were standardized (e.g., by the Object Management Group); others such as the Event-Driven Process Chain (EPC) are de-facto industry standards. Still others focus on specific areas or are even company specific. This has resulted in many separate modeling tools in the market, most of which only provide a few domain-specific modeling methods. In order to ensure the consistency of modeled content, integrative modeling tools (such as the ARIS Platform by Software AG of Darmstadt, Germany) provide a broad range of standard and common modeling methods that are typically required.

Since the modeling methods keep evolving, the corresponding modeling tools are constantly extended in order to address each method/method change. This can lead to very complex tool implementations. However, many users do not require or even use the entire breadth of modeling tools provided by a particular system and instead use only a subset of tools depending on the specific goal to be accomplished. Instead of building modeling tools that provide a one-size-fits-all solution, a basic modeling tool could consider modeling artifacts as "resources" and provide their own editor representations while considering the user context at the same time.

Following the proposed approach, modeling tools presented to the user no longer need to encompass all functionality potentially required for designing models. Thus, in some embodiments, modeling tools can be provided that are specific to the needs of a particular user at a particular time (e.g., on demand). Context-specific functionalities can also be provided to the user by generating a design tool and/or design tool components tailored to the user's needs. Preferably this is accomplished without extending the designer tool itself, allowing for both flexible designer and method extensions.

An additional benefit of this approach can be consistency across different database systems. For example, one exemplary embodiment that can provide consistency is a Representational State Transfer (REST) architecture. REST is an architectural style, where each object is considered a resource that can be identified by an URI. Each resource can have a number of representations that can be accessed by clients using a communications protocol. In some embodiments, REST uses a stateless client-server communications protocol (e.g., HTTP) for communication. RESTful applications typically rely solely on that protocol to create, read, update or delete data. In some embodiments using the REST architecture, layer separation can be achieved to improve security. For example, communication can be carried out in a secure fashion on an HTTP layer (e.g., only Get, Post, Put, and Delete instructions can be trusted), whereas on the higher application layer, there can still be enough flexibility to perform all required operations. Thus, the underlying security of the HTTP layer can still be guaranteed for the higher layer.

Turning to the figures, FIG. 1A is a model example of an instance of meta-model "Value Added Chain Diagram" constructed using a BPM design tool. In this example, the model has an attribute called "name" (here "Process Landscape"). Symbols 110 represent objects and are connected by connections 115. Each of the connections 115 can indicate the relation of one object to another (e.g., "process-oriented superior" or "is predecessor of"). Each of the objects represented by the symbols 110 can have corresponding objects types (e.g., Function).

Figure 1B:
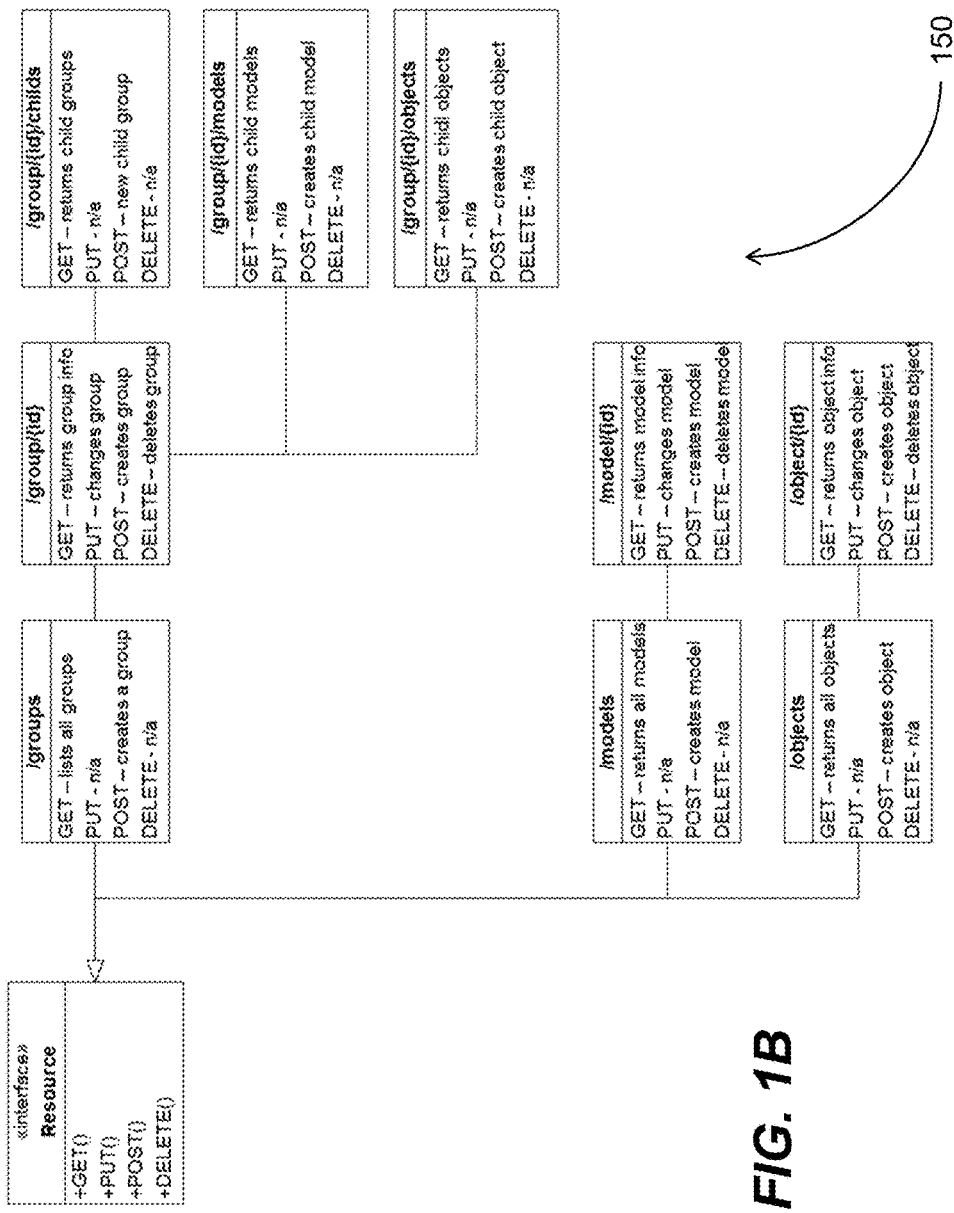
FIG. 1B is an extract of an exemplary resource object model.

For the examples provided herein, an exemplified RESTful BPM resource object model is described. FIG. 1B shows an extract 150 of a resource object model including implemented access, creation, and modification methods that was derived from the ARIS object model. While the extract 150 was derived from the ARIS object model, this is not required, and other object models can be used. On top of "read-only" representations, BPM resources can provide editor representations which can be displayed and executed in a general design tool (BYOE—bring your own editor). Editor representations of a BPM resource can contain all information and functionalities required to modify a resource. For example, a graphical editor representation can allow placing graphical symbols on a modeling canvas, to create relationships between objects by drawing lines, and can provide dialogs to maintain object attributes, while a spreadsheet editor representation can display the objects and their attributes in a table. These representations can differ significantly depending on the resource type.

Figure 2:
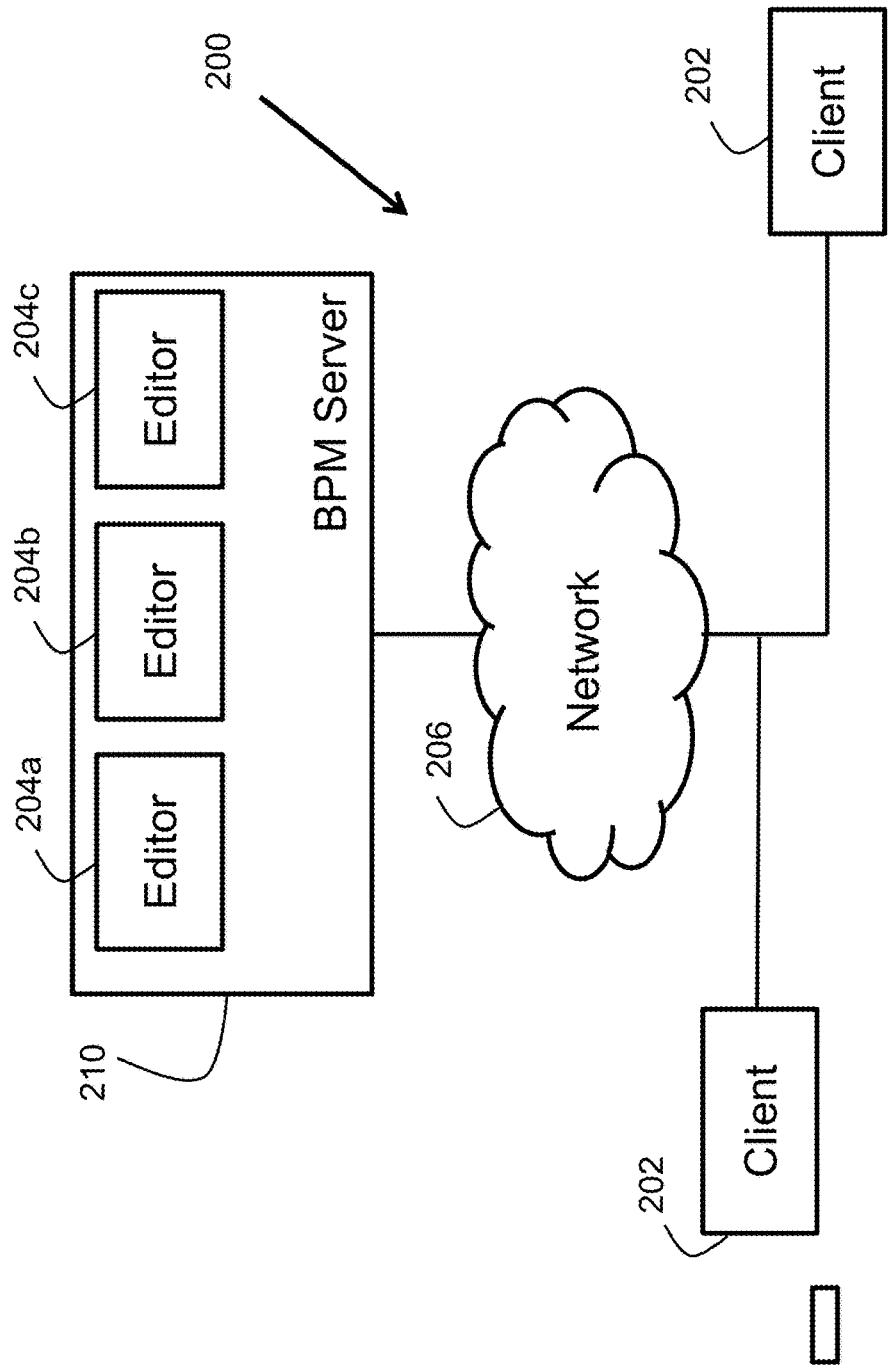
FIG. 2 is an exemplary computer system that can be used to implement embodiments of the disclosed subject matter.
Figure 3A:
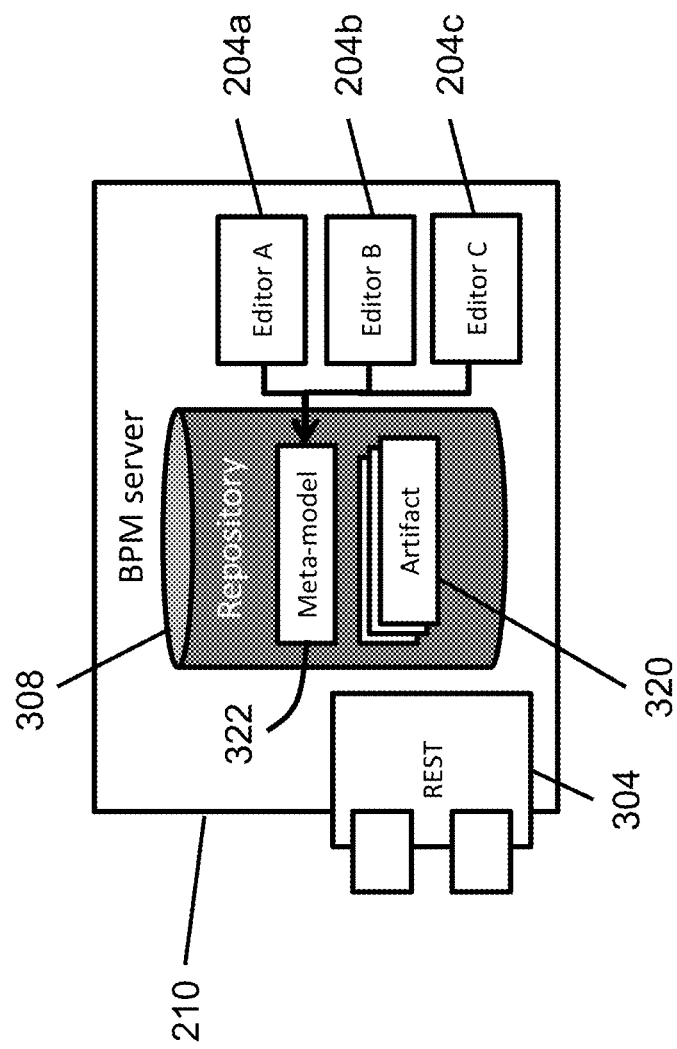
FIGS. 3A-3C show an exemplary embodiment of a BPM repository server.
Figure 3B:
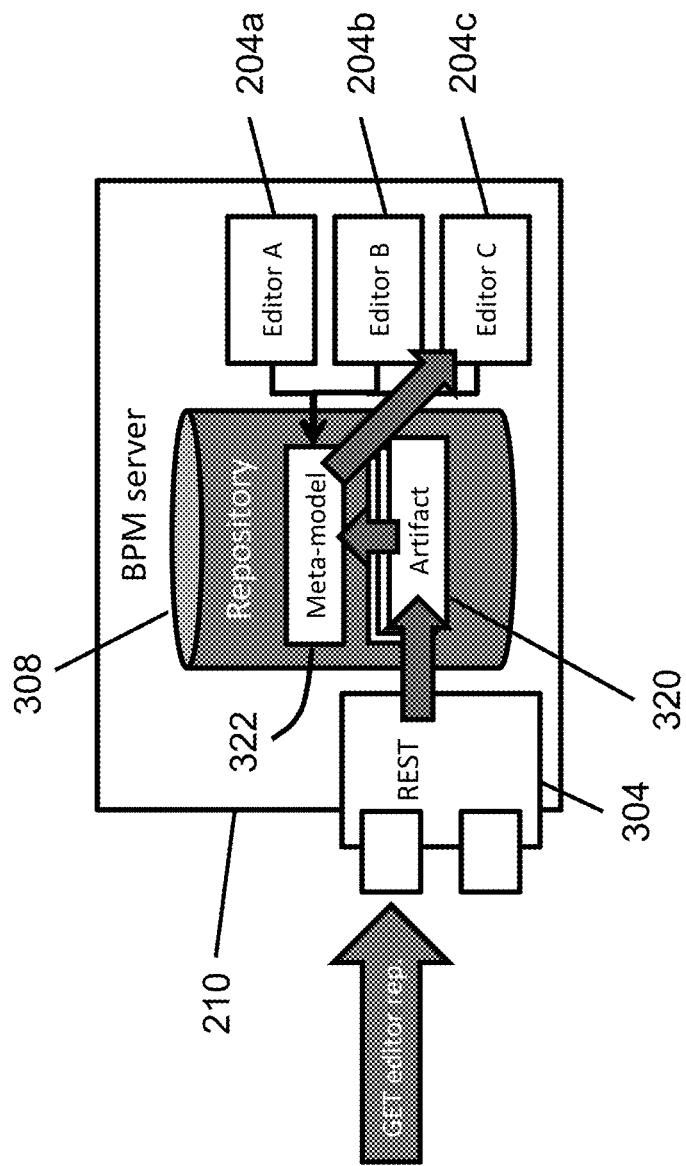
Figure 3C:
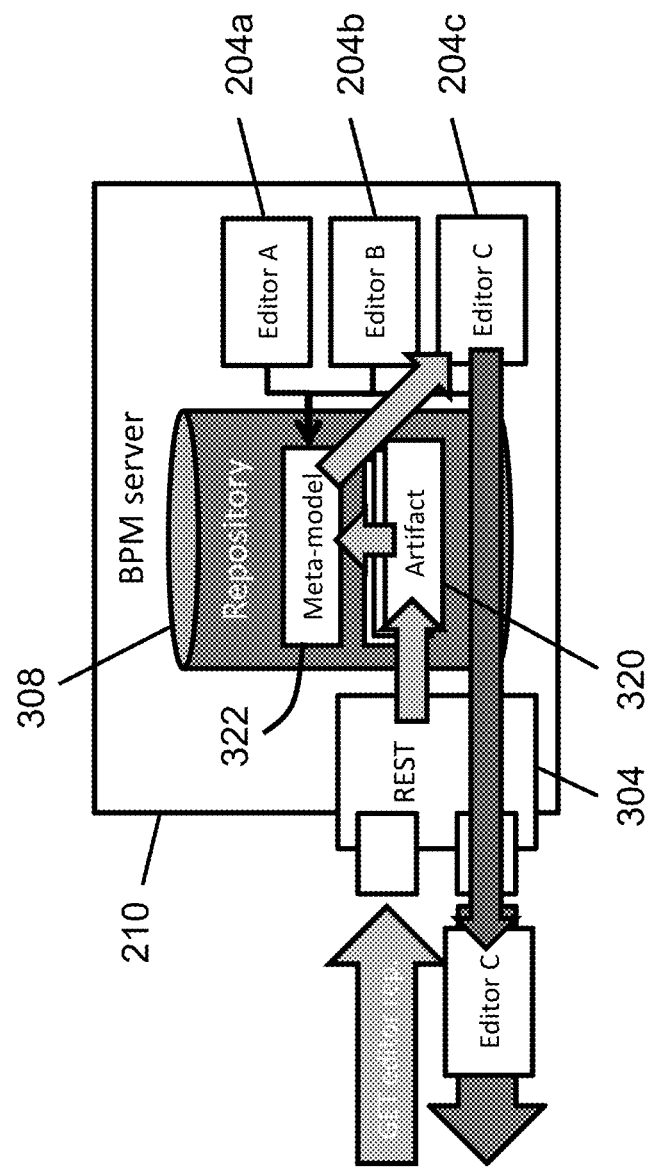

Referring to FIG. 2, a computer system 200 that can be configured to implement the functionality described herein can include client devices 202, editors 204, and BPM server 210, all of which can be connected to a network 206. FIGS. 3A-3C show a more detailed exemplary embodiment of the BPM server 210, which includes a REST interface 304, editors 204, and a repository 308 that includes artifacts 320 and a meta-model 322. Other embodiments of the computer system 200 and the BPM server 210 are possible. In some embodiments, the entire system 200 can be internal to a company, although this is not required.

The clients 202 can be, for example, smart phones, tablet devices, PDAs, desktop computers, laptop computers, servers, other computers, or other devices coupled via a wireless or wired connection to the network 206. Clients 202 can receive data from user input, a database, a file, a web service, and/or an application programming interface. The clients 202 can provide a BPM design tool to a user. The clients 202 can access the Internet/internet/intranet using, for example, an internet browser or the BPM design tool. In some embodiments, the clients 202 can access network-based resources using a VPN, for example.

The clients 202 can also include a cache (e.g., a non-transitory memory) to store previously retrieved editor representations, which can reduce client-server traffic and/or increase the speed of the BPM software. By caching editor representations, the client 202 can accumulate editors that are relevant for the user's work. In order to track editor representations, the system 200 can use identifiers for the individual editor representations. Once a resource is accessed by a user on the client 202, the resource's type can be determined by the client 202. Prior to the client 202 requesting the editor representation from the BPM server 210, the cache can be examined. If an editor representation is found, it can be used; otherwise, an editor representation can be retrieved from the BPM server 210. In some embodiments, the client 202 and/or BPM server 210 can verify that the editor representation cached by the client 202 is still up-to-date. If the desired editor representation is outdated, it can be updated from the BPM server 210.

The editors 204 can be used to manipulate, view, edit, and/or interact with repository content. For example, a graphical editor representation can allow placing graphical symbols on a modeling canvas to create relationships between objects by drawing lines, and provides dialogs to maintain object attributes, while a spreadsheet editor representation displays the objects and their attributes in a table. These representations can differ significantly depending on the resource type. An example of this is an editor used to create an organizational chart. Using the editor, a user can place boxes representing individual employees, assign attributes to individual employees, and show the relationship between the various employees with lines. Other examples of the editors 204 include text based editors, table editors, and swimlane editors. The editors 204 can be read-only and/or modifying and can provide additional attributes, allowing the BPM server 210 to define an arbitrary combination of read-only and writing editor representations for a certain user context/role. For versioning of the editors 204, a version number is typically stored as attribute for each of the editors 204.

The editors 204 can be individually assigned to artifacts of meta-model 322. To determine potential editors for artifacts 320, their respective meta-model artifact—and hence the assigned editors—can be determined. The assignment of editor component implementations to meta-model artifacts can be defined in a separate model, the editor component assignment model (ECAM), which is described more fully below. Artifacts in the repository 308 can inherit editor representations of parents in the meta-model 322. For example, a modeling method that was derived from the modeling method Event-Driven Process Chain (EPC) can reuse any editor representation linked to EPC. Derived methods also can extend or replace parent editor representations.

The editor 204 can also be optimized for use by a particular user based on the user context and credentials of that user. For example, an editor representation can be optimized depending on whether the user is using a mobile device, the screen size, etc. The display limitations can, for example, allow the system to provide the most suitable editor component for a modeling artifact in a given user context (e.g., on small mobile devices, models should be displayed as an object table instead of a graph model). For instance, a simplistic editor component implementation could be an HTML form containing fields for each attribute of a resource, or a configuration file for building the editor user interface on the client itself. The role of context in determining the editor representation is described more fully below.

Generally, two types of BPM resource modeling tools are described: a delegating editor and a hybrid editor.

Delegating editors typically provide no standard modeling functionalities and rely exclusively on the editor representations provided by individual resources (e.g., from the BPM server 210) generally serving as a kind of resource browser. For resource editing, the selected resource's editor representation is requested from the BPM server 210. Typically, a delegating editor does not have any common modeling functionalities itself (e.g. placing or moving of objects, setting attribute values, etc.) and will only have those functionalities provided by the BPM server 210.

In contrast, hybrid editors typically provide at least some common modeling functionalities (e.g., placing, moving, resizing of objects) which can then be extended by additional resources' editor functionalities. In other words, hybrid editors can extend delegating editors by including the most common modeling functionalities in the editor itself and relying on editors provided by individual resources for less-common modeling functionalities. This can reduce the number of editor functionalities that need to be contained in the resources' editors. In some embodiments, to create a hybrid editor, each resource editor typically must contain a complete listing of all the functions it implements, because many of them will be provided in the set of standard functions that the hybrid editor will provide. De-duplication of the functions can be performed before presenting the editor to the user, resulting in an editor with a combination of standard functionality and additional necessary functionality for the particular resource.

Figure 4:
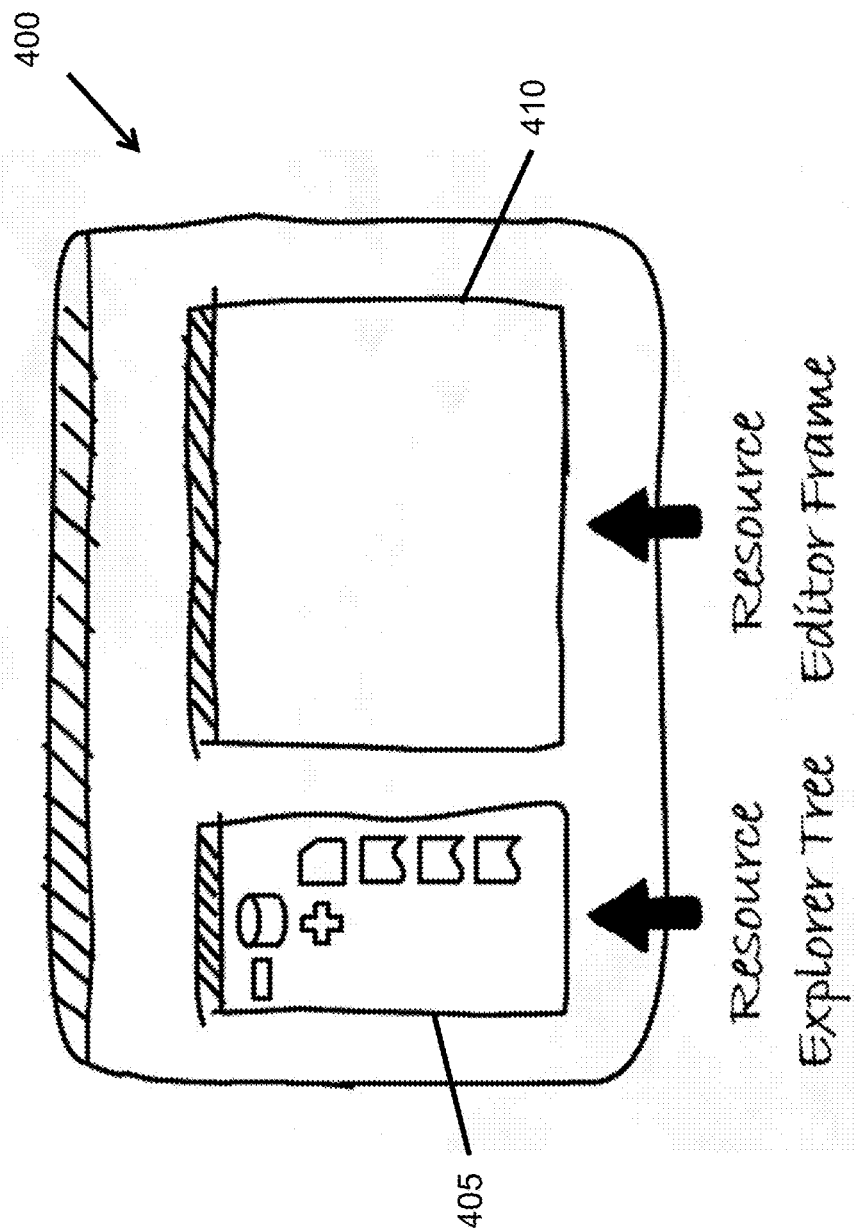
FIG. 4 is an exemplary simple delegating resource editor.

Referring to FIG. 4 an exemplary simple delegating editor 400 is shown that includes a resource explorer tree 405 and a resource editor frame 410. A delegating editor mainly provides functionalities for navigating through BPM resources and for identifying the user context. For resource editing, it typically relies completely on resource editor representations provided from an external source (e.g., the BPM server 210). In some embodiments, once a resource is selected for editing in the explorer tree 405, the resource's editor representation is requested from the BPM server 210. The BPM server 210 examines the given user context (which can be provided by the client 202) and returns a suitable corresponding editor representation. The editor representation provided by the BPM server 210 can then be displayed in the editor frame 410 (e.g., in some embodiments, the resource editor frame 410 is a container for resource editors). The process of requesting an editor representation is described more fully below.

A simple exemplary embodiment of the delegating editor is a website using an iframe for each of the resource explorer tree 405 and the resource editor frame 410. Upon selecting a resource for editing in the resource explorer tree 405 iframe, a corresponding HTML-based resource editor can be provided by the BPM server 210 and can be displayed in the resource editor frame 410 iframe. In a highly-abstracted embodiment, only the returned editor representation would be displayed (e.g., when clicking an organizational chart image representation in a browser, a new tab is opened, only containing the editor representation).

The editors 204 can be implemented using any technology and/or can be optimized for different types of the clients 202. For example, in one embodiment, the editors can be based on HTML5 and can include multiple versions, namely "model editor D", "model editor M" and "object editor". Model editor D can be realized on an HTML5 canvas and can be a comprehensive editor providing a variety of functionalities such as placing, moving and resizing model elements that is optimized for desktop devices. Model editor M can be realized as an HTML5 table and can be optimized for mobile devices (e.g., it can list objects and relations as an HTML5 table). The object editor can provide functionalities to change attributes of an object using an HTML5 form. Below are exemplary basic editor implementations in HTML5:

TABLE 1

| Model editor D | Model editor M | Object editor |
| --- | --- | --- |
| <html> | <html> | <html> |
| <body> | <body> | <body> |
| <canvas id="..."> | <table id="..."> | <form id=".."> |
| ... | ... | ... |
| </canvas> | </table> | </form> |
| </body> | </body> | </body> |
| </html> | </html> | </html> |

Figure 5:
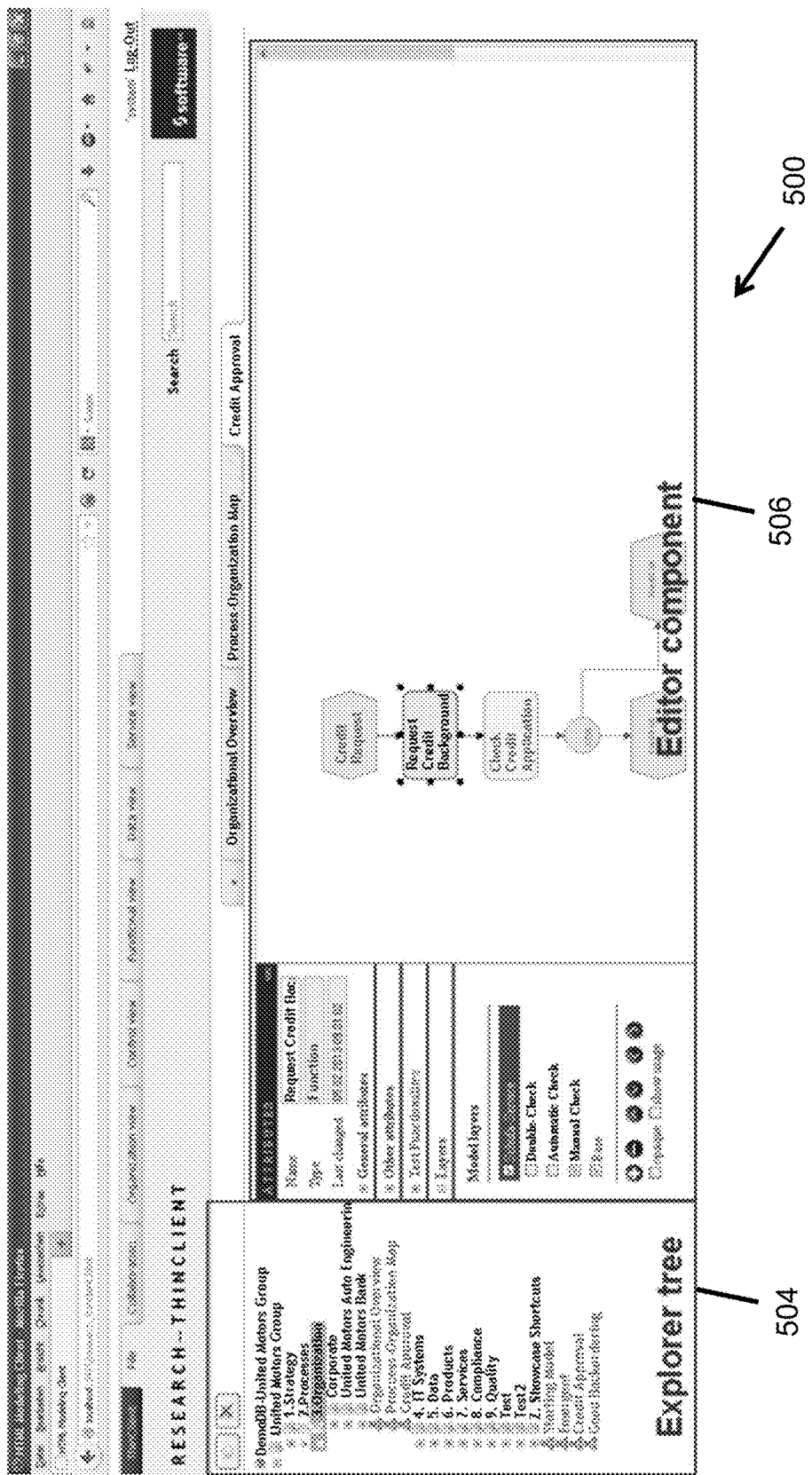
FIG. 5 is an exemplary thin-client embodiment of a delegating resource editor.

Referring to FIG. 5 an exemplary embodiment 500 of a delegating editor using an HTML5 based thin client without caching is shown (e.g., this embodiment uses "Model Editor D"). The thin client can be an HTML website containing two portions 504 and 506. Portion 504 can include an explorer tree to browse the BPM repository and portion 506 can display editor components. To populate the explorer tree in portion 504, an HTTP request can be triggered when loading the page, returning the contents of the repository. When selecting an explorer tree item, the corresponding resource's editor representation can be retrieved by another HTTP GET request and set as content of the portion 506. The user context can also be passed to allow for a selection of the most appropriate editor representation. FIG. 5 shows the thin client using editor component "Model editor D" to edit an artifact of type EPC. While FIG. 5 shows a "thin" client, a "rich" client can also be used. In some embodiments a thin client can include those clients that depend heavily on resources provided by another source, such as the BPM server 210. For example, a thin client can provide an interface between an end-user application and various back-end servers, databases, and/or platforms. Other embodiments of a thin client are possible.

Referring back to FIGS. 2 and 3A-3C, the network 206 can be a local area network (LAN), a wide area network (WAN), the Internet, cellular network, satellite network, or other networks that permit communication between the BPM server 210, the clients 202, and other devices communicatively coupled to the network 206. The network 206 can further include one, or any number, of the exemplary types of networks mentioned above operating as a standalone network or in cooperation with each other. The network 206 can utilize one or more protocols of one or more clients or servers to which they are communicatively coupled. The network 206 can translate to or from other protocols to one or more protocols of network devices. Although network 206 is depicted as one network, it should be appreciated that according to one or more embodiments, network 206 can comprise a plurality of interconnected networks. In some embodiments, the network 206 can be completely internal to a company (e.g., an intranet), and/or can be accessed via a virtual private network (VPN).

In some embodiments, the BPM server 210 is repository based and can be extended by a REST interface. As shown in FIG. 3A-3C, the BPM server 210 can include a REST interface 304 and a repository 308. The BPM server 210 can be any implementation of a BPM server. In some embodiments, the BPM server 210 can be an extended ARIS Business Server provided by Software AG of Darmstadt, Germany.

The BPM server 210 can include non-transitory electronic storage (e.g., the repository 308) that stores electronic information. The storage can be network accessible storage and can be local, remote, or a combination thereof to BPM server 210 and clients 202. The electronic storage can, for example, utilize a redundant array of inexpensive disks ("RAID"), magnetic tape, disk, a storage area network ("SAN"), an internet small computer systems interface ("iSCSI") SAN, a Fiber Channel SAN, a common Internet File System ("CIFS"), network attached storage ("NAS"), a network file system ("NFS"), optical based storage, or other computer accessible storage. The electronic storage can also be used for backup or archival purposes. While the BPM server 210 is shown as a single box in the figures, it is not limited as such. For example, the BPM server 210 can be made up of separate physical servers. Additionally, portions of the BPM server 210 can be operated by different entities in different locations.

Figure 6:
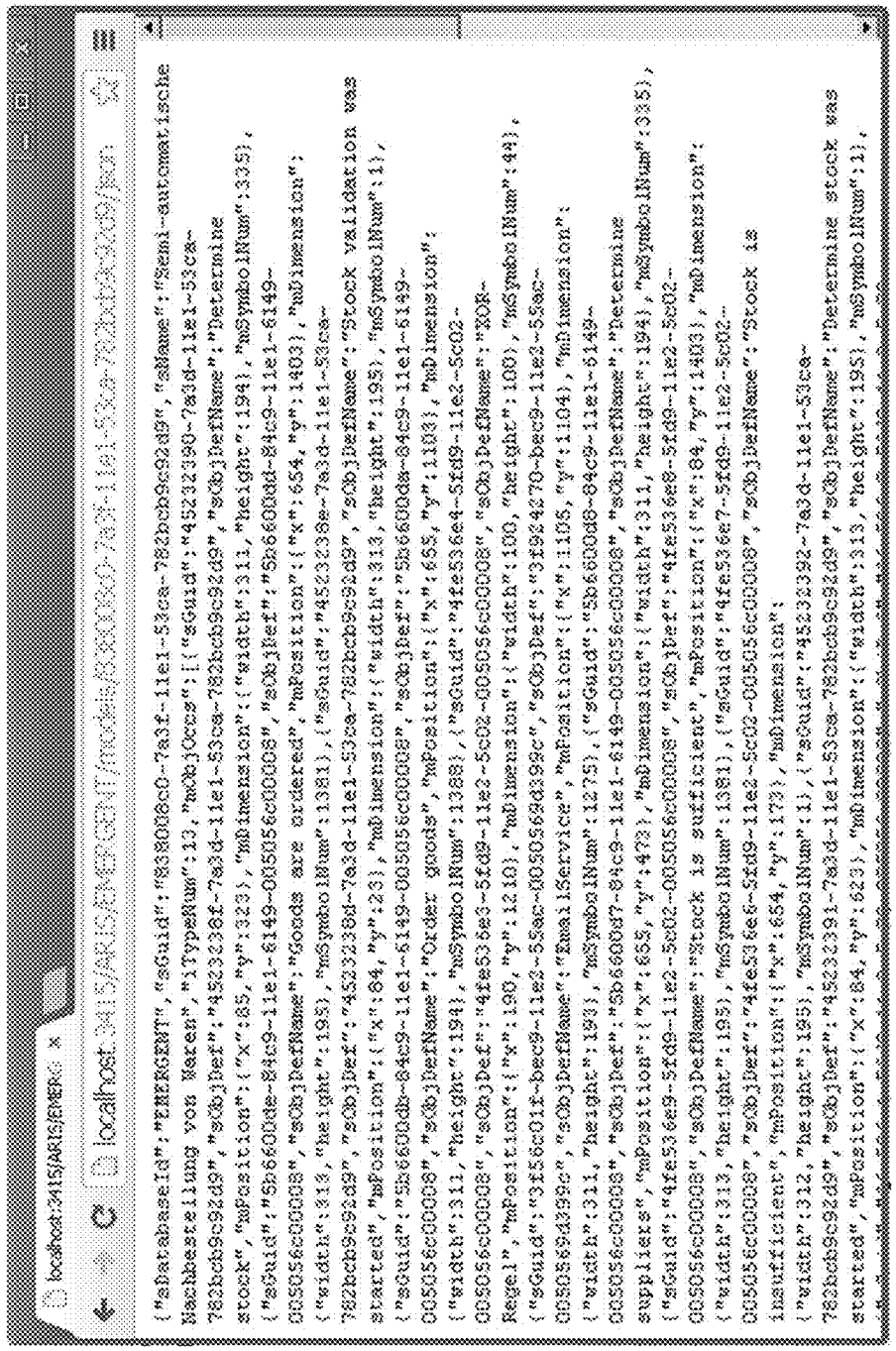
FIG. 6 is an exemplary JSON representation of a model instance resource.
Figure 7:
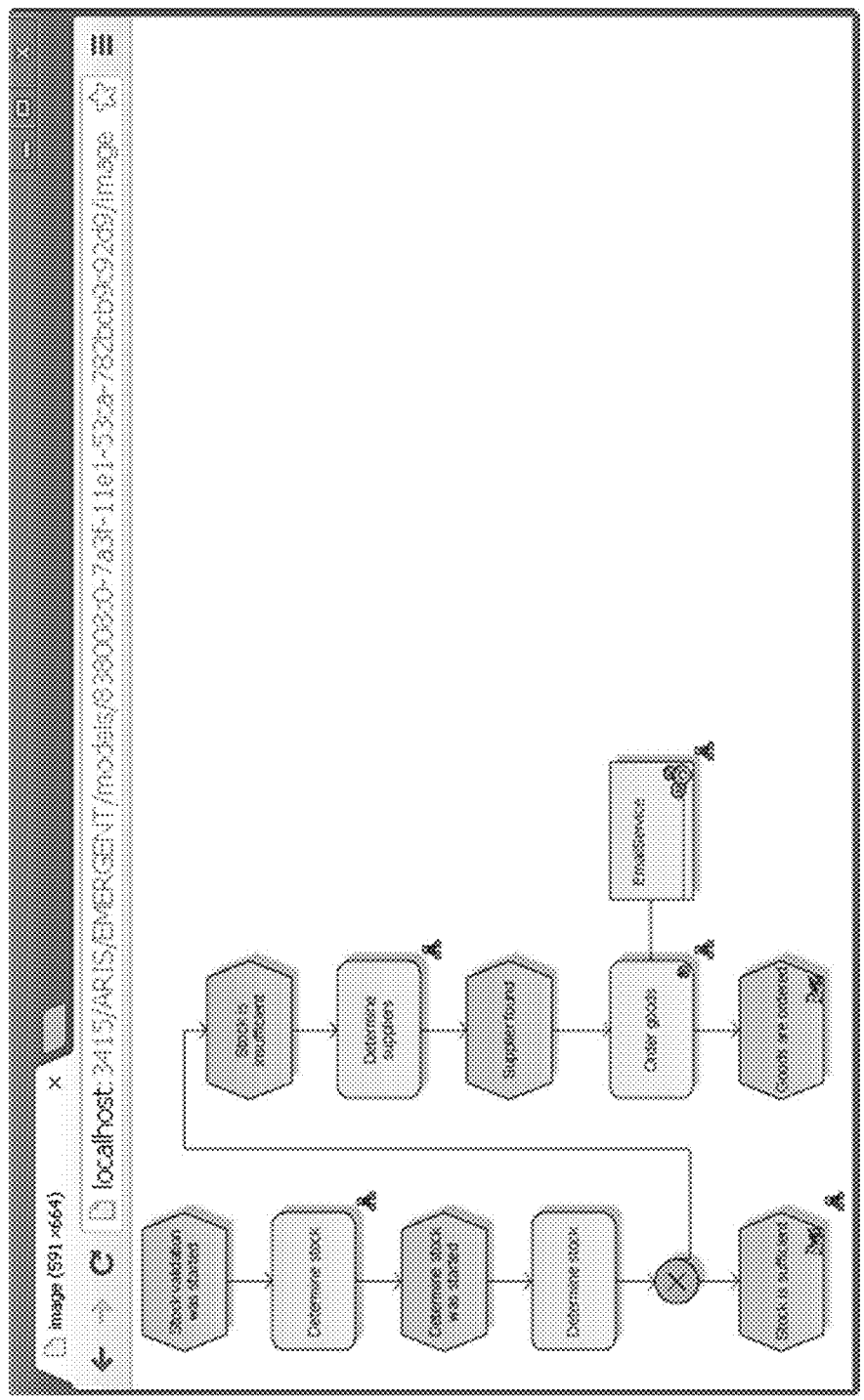
FIG. 7 is an exemplary image representation of a model instance resource.

The REST interface 304 can be realized using JAX-RS, the Java API for RESTful web services (see, e.g., JSR 311: JAX-RS provided by Java Community Process). FIGS. 6-7 show two exemplary representations for the same instance of resource type "model" which can be returned as response to a HTTP GET request sent to the REST interface extension of the BPM server 210: one returning a JSON representation (e.g., FIG. 6), the other returning the model as a PNG image (e.g., FIG. 7). Typically, the REST interface 304 is configured to return representations of resources such as an editor resource.

Referring back to FIGS. 2 and 3A-3C, the repository 308 can be accessed by the clients 202 through the REST interface 304. The repository 308 can include multiple modeling artifacts 320 and a meta-model 322.

The artifacts 320 can be resources in the repository 308, such as models, content, and/or functions. For example, one of the artifacts 320 can be the function "determine inventory," corresponding to a process that can determine the inventory of the desired element of the database. In some embodiments, each of the artifacts 320 possesses a unique identifier, the GUID, and an artifact type number. Typically each of the artifacts 320 are instances of artifacts defined in the meta-model 322.

The meta-model 322 can describe a model type and different relationships that are related to the model type. The meta-model 322 can also define which model types, objects types, and relationship types exist. Additionally, the meta-model 322 can be a formalism and/or abstract language consisting of a set of modeling concepts (e.g., the language's abstract syntax) along with well-defined semantics, which can be used to describe models. Part of a meta-model's specification is typically the definition of what constitutes a valid "sentence" in this abstract language, e.g., how the modeling concepts can be combined to describe more complex structures. Additionally, the meta-model 322 can provide a lookup reference to determine editor implementations for instances of the meta-model. For example, if the system has the process model for the function "determine inventory," the system can determine the model type (e.g. "EPC"), and use the editor component assignment model to determine which editors are available for use with the EPC model type.

Figure 8:
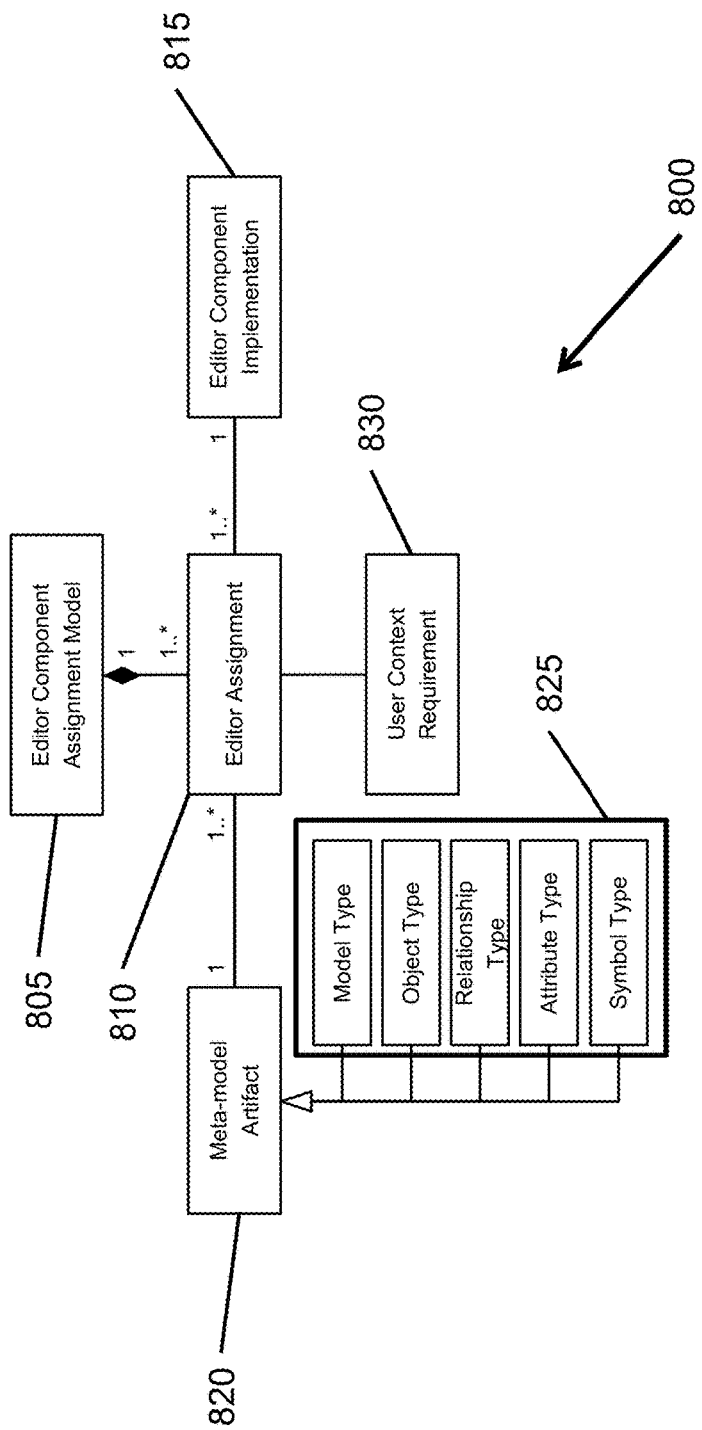
FIG. 8 is an exemplary editor component assignment model (ECAM) class diagram.

Referring to FIG. 8, an exemplary class diagram 800 of the editor component assignment model (ECAM) is shown. ECAMs can be used (along with user context in some embodiments) to define which artifacts can be edited using which editor implementation. The class diagram 800 includes ECAM 805, which typically includes at least one or more editor assignments 810. In most embodiments, for each editor assignment 810, exactly one editor component implementation 815 is assigned to exactly one meta-model artifact 820. In this embodiment, meta-model artifact 820 can be, for example, a model type, object type, relationship type, attribute type or symbol type (e.g., 825). For each editor assignment 810, an arbitrary number of user context requirements 830 can be assigned (e.g., device type, screen size, etc.). The linking of the editors to the artifact types of the meta-model can be performed by, for example, an administrator with knowledge of the system using a configuration file and/or a model in the repository 308.

Figure 9:
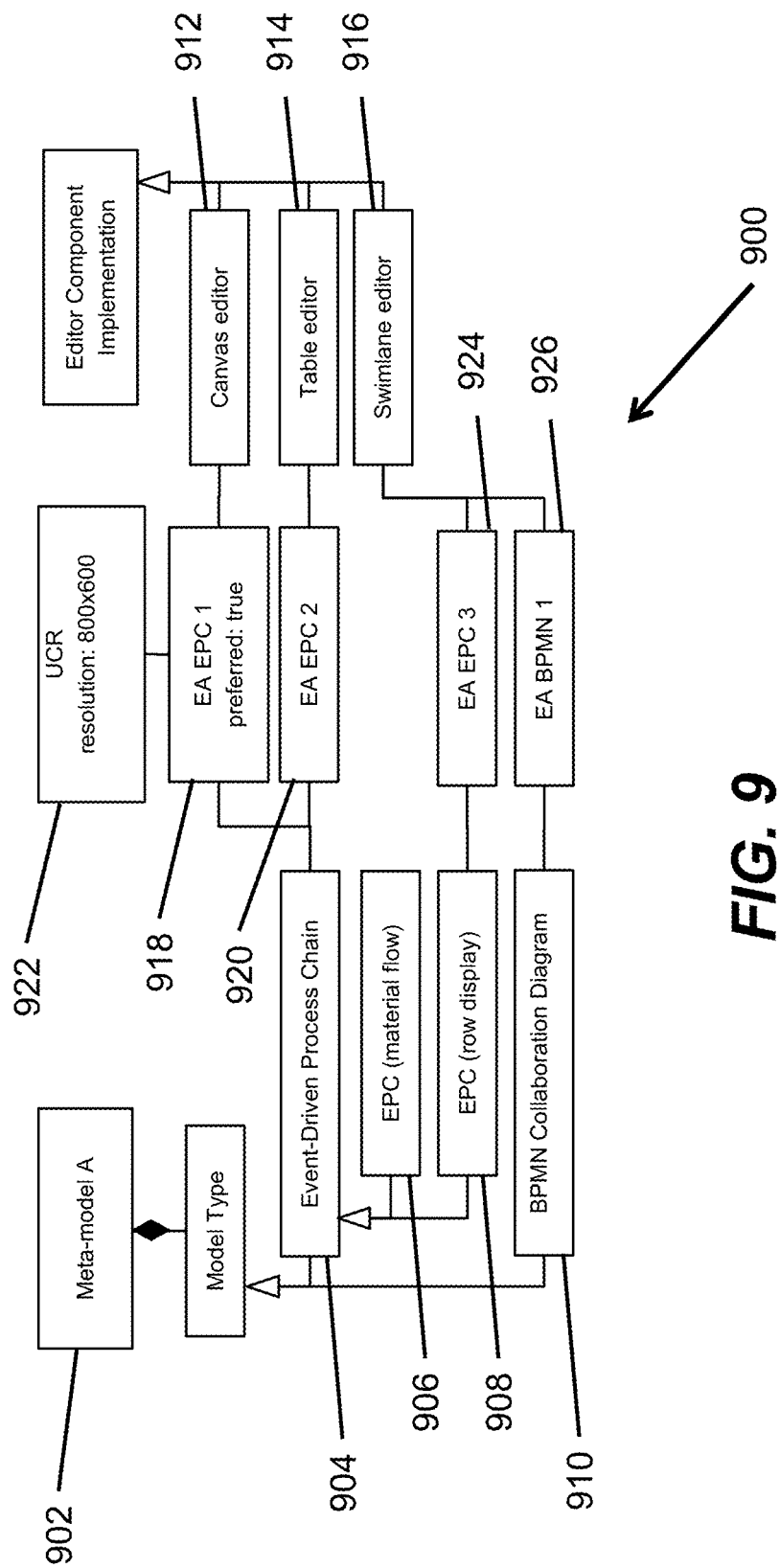
FIG. 9 is an exemplary editor component assignment model (ECAM) instance.

Referring to FIG. 9, an exemplary instance 900 of an ECAM is shown. The instance 900 includes exemplary instances of different editor assignments based on a client's particular user context and desired model type. Although reference will be made to specific model types, it should be understood that these are merely examples, and any model type or method can be used. In this embodiment, four model types can be defined for meta-model 902 (e.g., models types 904, 906, 908, and 910). Model type 904 can be an event-driven process chain (EPC). Model type 906 can be an EPC (material flow). Model type 908 can be an EPC (row display). Model type 910 can be a BPMN collaboration diagram. In the embodiment shown in FIG. 9, the model types 906 and 908 are both derived from model type 904. The editors available for assignment to the client by the BPM server 210 can include a canvas editor 912, a table editor 914, and a swimlane editor 916.

As shown in FIG. 9, model type 904 has two direct editor assignments ("EA"): editor assignment 918 (EA EPC 1) and editor assignment 920 (EA EPC 2). In this embodiment, editor assignment 918 is set to the "preferred" editor assignment over other potential editors (e.g., because it the more powerful of the two editors for editing EPC models). Editor assignment 918 defines that resources of model type EPC can be edited using the canvas editor 912 subject to the user context requirement 922 being fulfilled. In this example, the user context requirement 922 is fulfilled when the user's screen resolution is at least 800×600 pixels. The user context requirements 922 can vary and typically help the BPM server 210 determine which is the best editor to assign. For example, the user context requirements can include characteristics such as visual display constraints (e.g., screen resolution, screen size, screen orientation), the user's role, the user's access rights, the type of device being used (e.g., Apple versus Motorola), and intention (e.g., view or edit). The user context requirements are discussed more fully below with respect to FIG. 12.

Editor assignment 920 defines that EPC model types can also be edited using the table editor 914. If a user connects to the BPM server 210 using a mobile device with less than 800×600 pixels and requests an editor for a model resource of type EPC, the BPM server 210 will return the table editor 914 as the editor representation, while a user connecting via desktop PC (with a screen larger than 800×600) would receive the canvas editor as the editor representation.

Model types that are children of other model types can have direct editor assignments and/or can inherit editor assignments from parents in the meta-model. For example, in the example shown in FIG. 9, model type 906 (EPC (material flow)) has no direct editor assignment and instead inherits its editor assignment from its parent in the meta-model. Thus, in this example, the editor assignments for model type 906 are treated in the same manner as the editor assignments described above for model type 904. In contrast, model type 908 (EPC (row display)), which is also derived from model type 904, has a direct editor assignment, editor assignment 924 (EA EPC 3), which is set to the swimlane editor 916. Likewise, model type 910 also has a direct editor assignment 926, which is also set to the swimlane editor 916. Thus, any user trying to interact with resource having a model type 908 or 910, will be provided with the swimlane editor 916.

Referring to FIG. 10, as noted above for model type 906, a user and/or another role can create new model types from existing model types. For example, a user/role can derive a new model type from an existing model type, where the derivation is considered a child of the existing model type. In this situation, the editor representation for the new model type assigned using the ECAM can be inherited from the parent as noted above. For example, a list 1000 of model types defined in the repository 308 is shown. In this example, the highlighted model type 1005 was derived from its parent 1010; thus, the editor representations used by the model type 1005 can be inherited from the parent 1010 (similar to that described above for model types 904 and 906).

Figure 11:
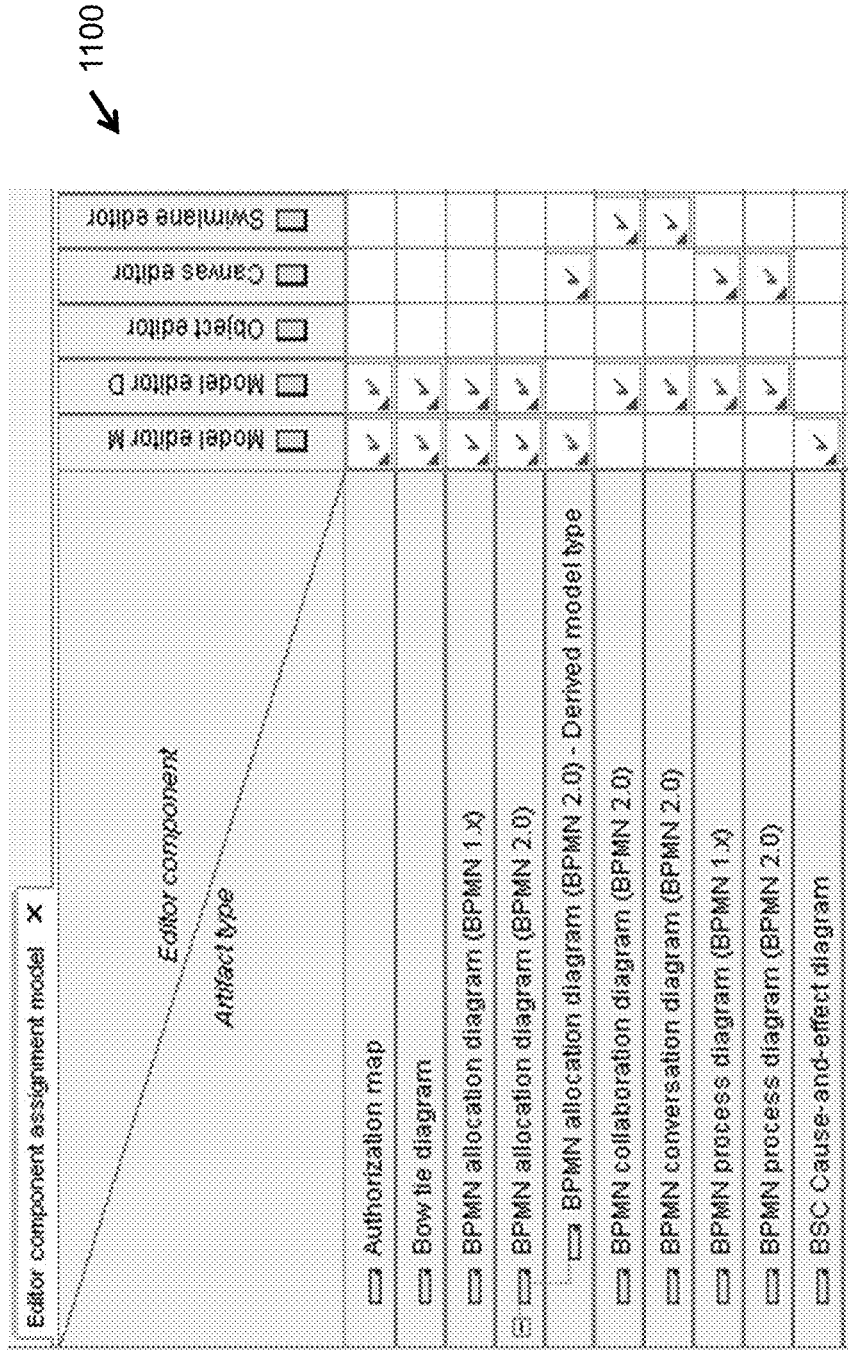
FIG. 11 is an exemplary editor component assignment model (ECAM).

Referring to FIG. 11, an exemplary user interface 1100 including a matrix model that can be used to configure the ECAM is shown. In this interface, an administrator and/or other role can define which artifact types can be edited using which editors. For example, the administrator can place checkmarks in the interface defining the mapping between artifact types and respective editor components. The checkmarks can indicate a "can edit" relationship between editor component implementations and artifact types. The relationship can be assigned to a model to define user context restrictions. Any artifact with multiple assigned editors can be edited by any of the assigned editors depending on the user context or other constraints. Other interfaces to configure the ECAM are possible.

As discussed above, the editor assignment for a particular model type can be affected by user context requirements. Referring to FIG. 12, an extract 1200 of the Foundation for Intelligent Physical Agents (FIPA) device ontology that can be used for defining user context requirements is shown. The parameters 1202 shown in FIG. 12 can be used to define user context requirements using a model-based definition as shown in, for example, FIG. 13. In this exemplified implementation, the user context requirements can be specified as a model which is assigned to the relationships between method artifacts and editor components (e.g., as described above in FIG. 11).

Figure 13:
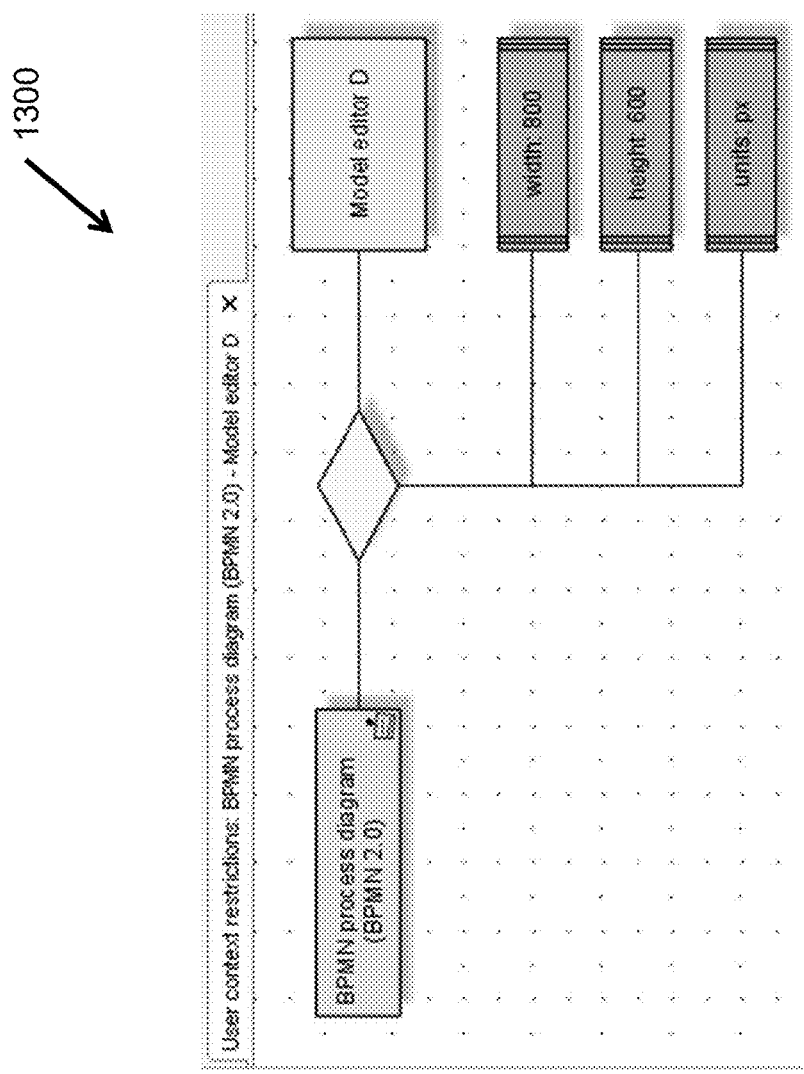
FIG. 13 is an exemplary model-based definition of user context restrictions.

FIG. 13 shows the user context requirements for being allowed to edit resources of type "BPMN process diagram (BPMN 2.0)" using the editor "Model editor D." When the editor component for a resource is requested via an HTTP GET request, the BPM server 210 can first determine the corresponding artifact in the repository. The GET request contains the GUID of the artifact and the current user context (e.g., "width: 1024, height: 768, units: px"). If an artifact of the given GUID is found, its artifact type (e.g. "BPMN process diagram (BPMN 2.0)") can be determined by the artifact's type number. By examining the editor component assignment model, the editor components assigned to the determined artifact type can be retrieved (e.g., as described above in FIG. 9). For each editor component assignment, the user context restrictions can be evaluated. The editor representation for which all user context restrictions are fulfilled is returned as response. In this example, "Model editor D" would fulfill all user context restrictions and would be returned as editor representation. If multiple editors fulfill all user context restrictions, the BPM server 210 can choose the "preferred" editor.

Referring FIGS. 3A-3C, the progression shown therein is described. As noted above, FIG. 3A shows an exemplary architecture of the BPM server 210 in which individual editor definitions are assigned to artifacts of the meta-model 322 in the repository 308.

If a user of the client 202 wants to edit content of the repository 308, the BPM server 210 can lookup existing editor component implementations in the ECAM and provide a suitable editor as an editor representation for the respective resource. To identify the most suitable editor, the BPM server 210 identifies the type of the resource that is to be edited as defined in the meta-model. For the identified resource type, the ECAM specifies which editor component implementations can be used to modify the repository content (e.g., FIG. 3B). In a next step, the client's context can be analyzed in order to select the most appropriate editor representation and/or to customize the selected editor to the client context. In this example, the user context passed in the request from the client 202 is matched against user context requirements given for each possible editor assignment. Based on the information in the ECAM (e.g., the editor assignment and the user context requirements), the BPM server 210 provides the selected editor component implementation to the client 202 (e.g., Editor C in FIG. 3C), which the client can display in a general BPM design tool.

When requesting a resource's editor, the representation and editor's functionalities can also be customized by the BPM server 210 based on context information such as requestor's user role, access rights, utilized device (e.g. mobile), and/or intention (view or edit). For example, device information can be gathered by the BPM design tool and passed in the header information of the GET request from the client 202 to the BPM server 210. Device ontologies such as the FIPA Device Ontology Specification can be utilized for standardized data exchange and for the definition of user context requirements in the editor component assignment model. Other ontologies can be used. User information such as access rights can be maintained in the BPM server 210. The BPM server 210 can use login information in its determination of which editor representation to provide (e.g. to provide user/role-specific editor representations).

Figure 14:
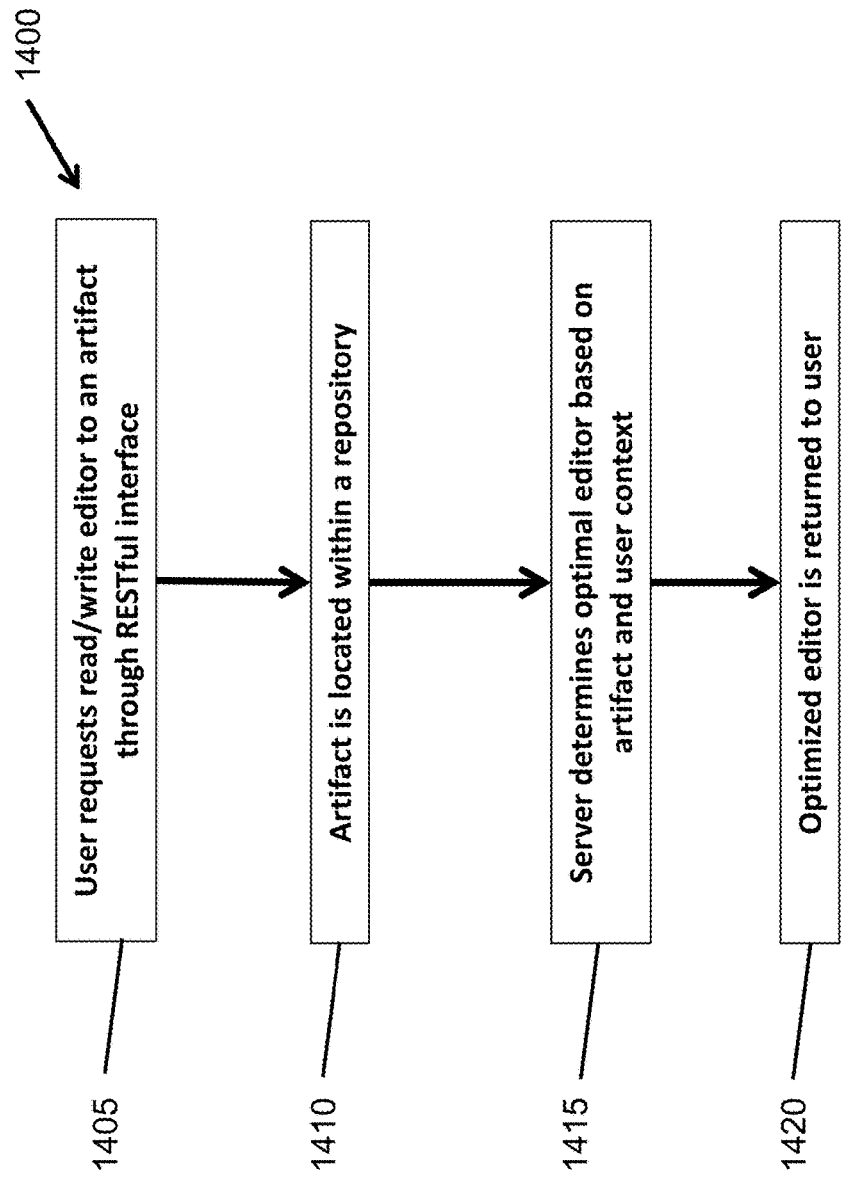
FIG. 14 is an exemplary flow diagram for generating and providing an optimized editor.
Figure 15:
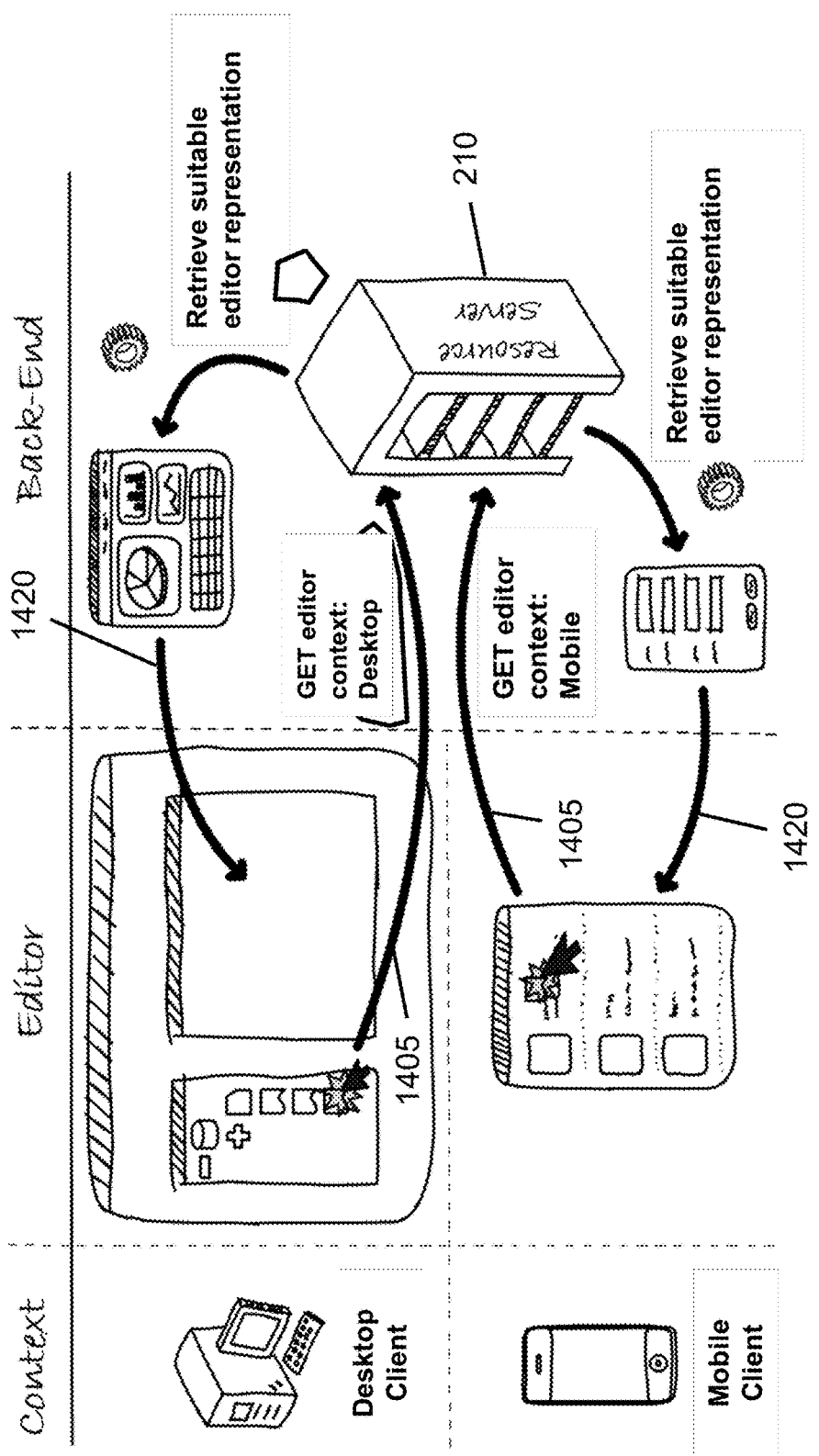
FIG. 15 represents context specific retrieval of BPM resource editor representations.

In operation, referring to FIGS. 14-15, a process 1400 for generating and providing an optimized editor using the system 200 includes the stages shown. The process 1400, however, is exemplary only and not limiting. The process 1400 may be altered, e.g., by having stages added, altered, removed, or rearranged.

At a general level, in the process 1400, the user selects a resource to edit using a BPM design tool on the client 202. The client 202 requests a resource editor representation from the BPM server 210. The BPM server 210 determines the best editor representation for the selected resource, and returns the editor representation to the user along with the requested resource. The user can then view and/or edit the selected resource using the editor provided by the BPM server 210. Additional details are provided next.

At stage 1405, a user requests read/write access to a resource for an artifact via a design tool on the client 202. This generates a GET editor command that is sent from the client 202 to the REST interface 304 via the network 206. Along with the GET command is typically i) the GUID of the resource that the user is trying to access, and ii) the user context information (e.g., "width: 1024, height: 768, units: px").

The request for the editor representation can be implicit and/or explicit. For example, in the delegating editor described herein, when the user clicks on an artifact in the explorer tree a request can be performed automatically, and without the user's knowledge. Alternatively, the user can explicitly request an editor. For example, in a graphical representation of a model (e.g., an organizational chart) embedded in an intranet website, the user could right-click and select "edit" in a context menu, thus invoking the GET editor request explicitly.

At stage 1410, the BPM server 210 receives the request from the client 202 via the REST interface 304. The BPM server 210 reads the GUID included in the request and determines the corresponding artifact in the repository 308.

At stage 1415, if an artifact of the given GUID is found, its artifact type (e.g. "BPMN process diagram (BPMN 2.0)") is determined by the artifact's type number. By examining the ECAM (e.g., instance 900 of the ECAM), the editor components corresponding to the determined artifact type can be retrieved. For example, referring to FIG. 11, it can be seen that the Model Editor D and Canvas Editor can be used to edit the artifact type "BPMN process diagram (BPMN 2.0)." For each editor assignment, the user context restrictions can be evaluated (e.g., screen size, device type, access level). The editor representation for which all user context restrictions are fulfilled is returned as response. In this example, "Model editor D" would fulfill all user context restrictions and would be returned as editor representation.

At stage 1420, BPM server 210 can provide an editor to the client 202 for use by the user. The editor representation can be displayed in the design tool client. The user can view and/or edit the requested resource using the editor provided by the BPM server 210.

Enabling BPM resources to provide their own editor representations can allow for very lightweight BPM designer implementations and ensure that the client only contains editing functionalities for modeling methods that the user really utilizes. This can lead to reduced hardware requirements on the client-side and can allow for a very flexible way of extending editors to newly introduced modeling methods without having to adapt client installations. If a new model type is introduced, the editor component assignment model can be extended once in a central place (on the BPM server) and appropriate editor component implementations are assigned for the new model type. If there is no appropriate editor component implementation, it can be implemented and deployed to the BPM server. When a user first accesses a resource of the new model type, the editor representation can be retrieved and cached on the client system for future use.

Additionally, editing functionalities can be encapsulated in individual editor representations, resulting in reduced software maintenance effort when changing editors. Using the user context information (e.g. user name), a user could theoretically customize or define his or her own editor representations and link them to the respective meta-model artifacts.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

What is claimed is:

1. A computerized method implemented on a computer system that electronically communicates with a plurality of client computer systems, the computer system including at least one hardware processor, the method comprising:
storing, in a database repository that is located on a non-transitory computer readable storage medium coupled to the at least one processor, a plurality of computerized editor representations that each display data differently, the database repository storing a plurality of artifacts used for creating a computerized model that is presented to a user on a client computer system, the plurality of computerized editor representations including a canvas editor, a table editor, and a swimlane editor;
receiving, at the computer system and via an electronic data communications network, a first computerized request from a client computer system for at least one editor-independent model artifact stored in the database repository, the first computerized request including a first user context requirement;
accessing, by the at least one processor, the requested at least one editor-independent model artifact within the database repository;
in response to the first computerized request, selecting, by the at least one processor, a first computerized editor representation from among the from the plurality of computerized editor representations based on the first computerized request and the first user context requirement,
dynamically generating, by incorporating the at least one editor-independent model artifact into the selected first computerized editor representation, a first editor instance to be graphically displayed with the incorporated at least one editor-independent model artifact on the client computer system, wherein the first editor instance is based on at least one of the canvas editor, the table editor, and the swimlane editor, wherein the dynamic generation of the first editor instance includes dynamic generation of first graphical source data that defines how the at least one editor-independent model artifact will be rendered for display as part of the first editor instance;
communicating the dynamically generated first editor instance to the client computer system for display thereon;
receiving, at the computer system and via an electronic data communications network, a second computerized request for the at least one editor-independent model artifact stored in the database repository, the second computerized request including a second user context requirement that is different than the first user context requirement;
in response to the second computerized request, selecting, by the at least one processor, a second computerized editor representation from among the from the plurality of computerized editor representations based on the second computerized request and the second user context requirement, where the second computerized editor representation is different from the first computerized editor representation;
dynamically generating, by incorporating the at least one editor-independent model artifact into the selected second computerized editor representation, a second editor instance such that the graphical display of the at least one editor-independent model artifact is displayed differently for the second editor than the first editor, where the second editor is different from the first editor based on the difference between the second user context requirement and the first user context requirement, wherein the second editor includes at least one of the canvas editor, the table editor, and the swimlane editor that is not selected as the first computerized editor representation, wherein the dynamic generation of the second editor instance includes dynamic generation of second graphical source data that defines how the at least one editor-independent model artifact will be rendered for display; and
communicating the second editor to another or the client computer system for display thereon.

2. The computerized method of claim 1, wherein the at least one processor receives the first computerized request through a Representational State Transfer (REST) interface.

3. The computerized method of claim 1, wherein the first and second user context requirements include a type of hardware.

4. The computerized method of claim 1, wherein first editor representation is communicated to the client computer system via a Representational State Transfer (REST) interface.

5. The computerized method of claim 1, further comprising determining a parent/child relationship between the at least one editor-independent model artifact and another artifact stored in the database repository.

6. The computerized method of claim 5, wherein the first computerized editor representation or the second computerized editor representation is selected as a function of the parent/child relationship.

7. The method of claim 1, wherein a user context requirement for the first or second user context requirements includes visual display constraints for a display screen, a user role, user access rights, a type of device being used, or whether access is sought to view or edit the at least one editor-independent model artifact.

8. A non-transitory computer-readable storage medium including instructions stored thereon, that, when executed by at least one processor, cause the at least one processor to:
store, in a database repository that is located on a non-transitory computer readable storage medium coupled to the at least one processor, a plurality of computerized editor representations that each display data differently, the database repository storing a plurality of artifacts used for creating a computerized model that is presented to a user on a client computer system, the plurality of computerized editor representations including a canvas editor, a table editor, and a swimlane editor;
receive, at the computer system and via an electronic data communications network, a first computerized request from a client computer system for at least one editor-independent model artifact stored in the database repository, the first computerized request including a first user context requirement;
access, by the at least one processor, the requested at least one editor-independent model artifact within the database repository;
in response to the first computerized request, select, by the at least one processor, a first computerized editor representation from among the from the plurality of computerized editor representations based on the first computerized request and the first user context requirement;
dynamically generate, by incorporating the at least one editor-independent model artifact into the selected first computerized editor representation, a first editor instance to be graphically displayed with the incorporated at least one editor-independent model artifact on the client computer system, wherein first editor instance includes at least one of the canvas editor, the table editor, and the swimlane editor, wherein the dynamic generation of the first editor instance includes dynamic generation of first graphical source data that is included with the first editor instance to define how the at least one editor-independent model artifact will be rendered for display;

communicate the dynamically generated first editor instance to the client computer system for display thereon;

receive, at the computer system and via an electronic data communications network, a second computerized request for the at least one editor-independent model artifact stored in the database repository, the second computerized request including a second user context requirement that is different than the first user context requirement;

in response to the second computerized request, select, by the at least one processor, a second computerized editor representation from among the from the plurality of computerized editor representations based on the second computerized request and the second user context requirement, where the second computerized editor representation is different from the first computerized editor representation;

dynamically generate, by incorporating the at least one editor-independent model artifact into the selected second computerized editor representation, a second editor instance such that the graphical display of the at least one editor-independent model artifact is displayed differently for the second editor than the first editor, where the second editor is different from the first editor based on the difference between the second user context requirement and the first user context requirement, wherein the second computerized editor includes at least one of the canvas editor, the table editor, and the swimlane editor that is not selected as the first editor, wherein the dynamic generation of the second editor instance includes dynamic generation of second graphical source data that is included with the second editor instance to define how the at least one editor-independent model artifact will be rendered for display; and communicate the second editor and the at least one editor-independent model artifact to another or the client computer system for display thereon.

9. The non-transitory computer-readable storage medium of claim 8, wherein the first computerized request is received through a Representation State Transfer (REST) interface.

10. The non-transitory computer-readable storage medium of claim 8, wherein the first and second user context requirements include a type of hardware.

11. The non-transitory computer-readable storage medium of claim 8, wherein the instructions are further configured to cause the first editor to be provided to the client computer through a Representational State Transfer (REST) interface.

12. The non-transitory computer-readable storage medium of claim 8, wherein the instructions are further configured to determine a parent/child relationship between the at least one editor-independent model artifact and another editor-independent model artifact in the database repository.

13. The non-transitory computer-readable storage medium of claim 12, wherein the first computerized editor representation is selected as a function of the determined parent/child relationship.

14. A computer system for at least one of viewing, editing, and handling Business Process Management artifacts, the system comprising:

a database repository configured to store a plurality of computerized editor representations that each display data differently, the database repository storing a plurality of artifacts used for creating a computerized model that is presented to a user on a client computer system, the plurality of computerized editor representations including a canvas editor, a table editor, and a swimlane editor;

at least one hardware processor coupled to the database repository, the at least one hardware processor configured to:

receive, at the computer system and via an electronic data communications network, a first computerized request from a client computer system for at least one editor-independent model artifact stored in the database repository, the first computerized request including a first user context requirement;

access, by the at least one processor, the requested at least one editor-independent model artifact within the database repository;

in response to the first computerized request, select, by the at least one processor, a first computerized editor representation from among the from the plurality of computerized editor representations based on the first computerized request and the first user context requirement;

dynamically generate, by incorporating the at least one editor-independent model artifact with the selected first computerized editor representation, a first editor instance to be graphically displayed with the incorporated at least one editor-independent model artifact on the client computer system, wherein the first editor includes the canvas editor, the table editor, or the swimlane editor, wherein the dynamic generation of the first editor instance includes dynamic generation of first source data that defines how the at least one editor-independent model artifact will be rendered as part of display of the first editor;

communicate the first editor to the client computer system for display thereon;

receive, at the computer system and via an electronic data communications network, a second computerized request for the at least one editor-independent model artifact stored in the database repository, the second computerized request including a second user context requirement that is different than the first user context requirement;

in response to the second computerized request, select, by the at least one processor, a second computerized editor representation from among the from the plurality of computerized editor representations based on the second computerized request and the second user context requirement, where the second computerized editor representation is different from the first computerized editor representation;

dynamically generate, by incorporating the at least one editor-independent model artifact into the selected second computerized editor representation, a second editor instance such that the graphical display of the at least one editor-independent model artifact is displayed differently for the second editor than the first editor, where the second editor is different from the first editor based on the difference between the second user context requirement and the first user context requirement, wherein the second editor includes the canvas editor, the table editor, or the swimlane editor that was not included in the first editor, wherein the dynamic generation of the second editor instance includes dynamic generation of second source data that defines how the at least one editor-independent model artifact will be rendered as part of display of the second editor instance; and communicate the second editor to another or the client computer system for display thereon.

15. The system of claim 14, wherein the at least one processor is coupled to a Representational State Transfer (REST) interface through which the first computerized request is received.

16. The system of claim 14, wherein the first and second user context requirements include a type of hardware.

17. The system of claim 14, wherein the at least one processor is further configured to cause the first editor to be provided to the client computer through a Representational State Transfer (REST) interface.

18. The system of claim 14, wherein the processor is further configured to determine a parent/child relationship between the at least one editor-independent model artifact and another editor-independent model artifact in the database repository.

19. The system of claim 18, wherein the processor is further configured to select the first editor as a function of the parent/child relationship.

20. The system of claim 18, wherein the first user context requirement and the second user context requirement include user access rights data and selection of the first and second computerized editor representation is based on what rights a user associated with the first user context requirement and the second user context requirement is granted.

* * * * *